United States Patent [19]

Banning et al.

[11] Patent Number: 5,750,604
[45] Date of Patent: May 12, 1998

[54] PHASE CHANGE INK FORMULATION USING A URETHANE ISOCYANATE-DERIVED RESIN

[75] Inventors: Jeffery H. Banning, Hillsboro; Clifford R. King, Salem, both of Oreg.; Loc V. Bui, Valencia, Calif.; Donald R. Titterington, Tualatin, Oreg.

[73] Assignee: Tektronix, Inc., Wilsonville, Oreg.

[21] Appl. No.: 672,609

[22] Filed: Jun. 28, 1996

[51] Int. Cl.$^6$ .............. C08J 3/00; C08K 5/16; C08L 75/00; C09D 11/00
[52] U.S. Cl. ............ 524/187; 101/491; 106/19 R; 106/20 R; 106/22 R; 106/23 R; 106/23 A; 106/23 H; 106/22 A; 106/22 H; 106/20 D; 106/19 F; 523/160; 523/161; 524/589; 524/590; 524/210; 524/230
[58] Field of Search .............. 524/589, 590, 524/210, 230, 187; 523/160, 161; 106/19 R, 20 R, 22 R, 23 R, 23 A, 23 H, 22 A, 22 H, 20 D, 19 F; 101/491

[56] References Cited

U.S. PATENT DOCUMENTS

| | | | |
|---|---|---|---|
| 2,409,712 | 10/1946 | Schweitzer | 260/453 |
| 3,012,991 | 12/1961 | Schultheis et al. | 260/75 |
| 3,653,932 | 4/1972 | Berry et al. | 106/22 |
| 3,796,678 | 3/1974 | Bartizal | 260/29.2 TN |
| 3,963,710 | 6/1976 | Aufdermarsh, Jr. | 260/247.2 |
| 4,011,311 | 3/1977 | Noomen et al. | 424/65 |
| 4,293,470 | 10/1981 | Cusurida | 260/45.9 |
| 4,297,501 | 10/1981 | Becker et al. | 560/24 |
| 4,334,032 | 6/1982 | Patton, Jr. et al. | 521/115 |
| 4,381,403 | 4/1983 | Falcone et al. | 560/24 |
| 4,390,369 | 6/1983 | Merritt et al. | 106/31 |
| 4,484,948 | 11/1984 | Merritt et al. | 106/31 |
| 4,501,915 | 2/1985 | McCoy | 560/157 |
| 4,537,960 | 8/1985 | Merger et al. | 544/86 |
| 4,665,146 | 5/1987 | Tortorello et al. | 526/304 |
| 4,684,956 | 8/1987 | Ball | 346/1.1 |
| 4,810,820 | 3/1989 | Slack et al. | 560/27 |
| 4,851,045 | 7/1989 | Taniguchi | 106/31 |
| 4,889,506 | 12/1989 | Connolly et al. | 439/874 |
| 4,889,560 | 12/1989 | Jaeger et al. | 106/27 |
| 4,889,761 | 12/1989 | Titterington et al. | 428/195 |
| 5,006,170 | 4/1991 | Schwarz et al. | 106/20 |
| 5,151,120 | 9/1992 | You et al. | 106/27 |
| 5,195,430 | 3/1993 | Rise | 100/168 |
| 5,221,335 | 6/1993 | Williams et al. | 106/23 |
| 5,372,852 | 12/1994 | Titterington et al. | 427/288 |
| 5,389,720 | 2/1995 | Markusch et al. | 524/839 |
| 5,389,958 | 2/1995 | Bui et al. | 347/103 |
| 5,496,879 | 3/1996 | Griebel et al. | 524/320 |

FOREIGN PATENT DOCUMENTS

| | | |
|---|---|---|
| 0187352 | 7/1986 | European Pat. Off. . |
| 0206286 | 12/1986 | European Pat. Off. . |
| 2294939 | 5/1996 | European Pat. Off. . |
| 4205636 | 8/1993 | Germany . |
| 4205713 | 8/1993 | Germany . |
| 9404619 | 3/1994 | WIPO . |
| 9414902 | 7/1994 | WIPO . |
| 9602399 | 9/1996 | WIPO . |
| 9602446 | 10/1996 | WIPO . |

OTHER PUBLICATIONS

"Polymer Chemistry—The Basic Concepts" by Paul C. Hiemenz, California State Polytechnic University, Pomona, California, page 7.
"Technical Product Information" Luxate® Isophorone Diisocyanate, by Olin Chemicals, Olin Corporation, 2 pgs.
"Advanced Organic Chemistry" Reactions, Mechanisms, and Structure, Third Edition, by Jerry March, Professor of Chemistry, Adelphi University, 6 pgs.
U.S. application No. 08/381,610, Jaeger et al., filed Jan. 30, 1995.

*Primary Examiner*—Patrick D. Niland
*Attorney, Agent, or Firm*—Ralph D'Alessandro

[57] ABSTRACT

Resins and waxes made by reacting selected nucleophiles, including alcohols and/or amines, with an isocyanate are disclosed. The order of addition of the isocyanate and the different nucleophiles can tailor the distribution of di-urethane, mixed urethane/urea, and/or di-urea molecules in the final resin product. The isocyanate-derived resin and wax materials are useful as ingredients as phase change ink carrier compositions used to make phase change ink jet inks.

22 Claims, 1 Drawing Sheet

PHASE CHANGE INK FORMULATION USING A URETHANE ISOCYANATE-DERIVED RESIN

BACKGROUND OF THE INVENTION

1. Field of the Invention

The present invention relates to resins or waxes made by reacting isocyanates with selected nucleophiles such as alcohols and/or amines. The nucleophiles can be used singly or in combinations to achieve certain desirable properties in the resins. The present invention also relates to phase change ink compositions, both generally and in specific compositions, containing such resins and/or waxes. More particularly, the present invention employs the use of an isocyanate-derived diurethane resin, which is the condensation reaction product of at least one alcohol, an isocyanate, a tackifier resin and a monoamide in a phase change ink carrier composition and the ink formed therefrom in printing applications. Still further, the present invention relates to the process of using such phase change ink compositions containing such resins and/or waxes in a printing device.

2. Description of the Relevant Art

In general, phase change inks (sometimes referred to as "hot melt inks") are in the solid phase at ambient temperature, but exist in the liquid phase at the elevated operating temperature of an ink jet printing device. At the jet operating temperature, droplets of liquid ink are ejected from the printing device and, when the ink droplets contact the surface of the printing media, they quickly solidify to form a predetermined pattern of solidified ink drops. Phase change inks have also been investigated for use in other printing technologies such as gravure printing as referenced in U.S. Pat. No. 5,496,879 and German patent publications DE 4205636AL and DE 4205713AL assigned to Siegwerk Farbenfabrik Keller, Dr. Rung and Co.

Phase change inks for color printing generally comprise a phase change ink carrier composition which is combined with a phase change ink compatible colorant. Preferably, a colored phase change ink will be formed by combining the above-described ink carrier composition with compatible subtractive primary colorants. The subtractive primary colored phase change inks of this invention can comprise four component dyes, namely, cyan, magenta, yellow and black. U.S. Pat. Nos. 4,889,506; 4,889,761; and 5,372,852 teach that the subtractive primary colorants employed typically may comprise dyes from the classes of Color Index (C.I.) Solvent Dyes, Disperse Dyes, modified Acid and Direct Dyes, and a limited number of Basic Dyes. The colorants can also include pigments as exemplified in U.S. Pat. No. 5,221,335, assigned to Coates Electrographics LTD. U.S. patent application Ser. No. 08/381,610, filed Jan. 30, 1995, and assigned to Tektronix, Inc., is directed to the use of a specific class of polymeric dyes in phase change ink compositions.

Phase change inks are desirable for ink jet printers since they remain in a solid phase at room temperature during shipping, long-term storage, and the like. Also, the problems associated with nozzle clogging due to ink evaporation are largely eliminated, thereby improving the reliability of ink jet printing. Furthermore, in the above-noted prior art phase change ink jet printers where the ink droplets are applied directly onto the printing medium the droplets solidify immediately upon contact with the substrate, migration of ink along the printing medium is prevented and dot quality is improved. This is also true of the processes and ink compositions described herein.

In addition to the above-referenced U.S. patents, many other patents describe materials for use in phase change ink jet inks. Some representative examples include U.S. Pat. Nos. 3,653,932; 4,390,369; 4,484,948; 4,684,956; 4,851, 045; 4,889,560; 5,006,170; and 5,151,120; as well as EP Application Nos. 0187352 and 0206286. These materials can include paraffins, microcrystalline waxes, polyethylene waxes, ester waxes, fatty acids and other waxy materials, fatty amide-containing materials, sulfonamide materials, resinous materials made from different natural sources (tall oil rosins and rosin esters are an example) and many synthetic resins, oligomers, polymers and co- polymers.

Separately, PCT patent application WO 94/14902, which was published on Jul. 7, 1994 and is assigned to Coates Brothers PLC, teaches a hot melt ink containing a colorant and, as a vehicle for the hot melt ink, an oligourethane having a melting point of at least 65° C. and obtained by reacting an aliphatic or aromatic diisocyanate with at least a stoichiometric amount of either: (i) a monohydric alcohol component; or (ii) a monohydric alcohol component followed by another different monohydric alcohol component; or (iii) a monohydric alcohol component, followed by a dihydric alcohol component, followed by a monohydric alcohol component.

This PCT patent application defines the monohydric alcohol component as either a monohydric aliphatic alcohol (e.g. $C_1$ to $C_{22}$ alcohols), an etherified dihydric aliphatic alcohol (e.g. propylene glycol methyl ether (PGME), dipropylene glycol methyl ether (DPGME), ethylene glycol butyl ether (EGBE), diethylene glycol butyl ether (DPGBE), tripropylene glycol butyl ether (TPGBE) and propylene glycol phenyl ether (PPL)); esterified dihydric aliphatic alcohol (e.g. the esterifying acid may be an ethylenically unsaturated acid (such as acrylic acid or methacrylic acid), thereby introducing ethylenic unsaturation into the oligourethane and rendering it suitable for eventual further additional polymerization (curing) after having been applied to a substrate by hot melt printing), or dihydric polyalkylene glycol. This PCT Application further defined the dihydric alcohol component as a dihydric aliphatic alcohol or a dihydric polyalkylene glycol (e.g. ethylene glycol, polyethylene glycol (PEG 1500), polypropylene glycol (PPG 750, 1000 and 1500), trimethylene glycol, dipropylene glycol, methylpropanediol and 1,6-hexanediol). Also, PCT patent application WO 94/04619, assigned to the General Electric Company, teaches the use of ionomeric materials in combination with image forming agents to form a hot melt ink jet ink. The ionomeric materials can include many different types of copolymeric or polymeric ionomers, including carboxyl-functional polyurethanes prepared from a diol or polyol and a hydroxyl acid. Many other carrier materials and colorants for the image forming agent of the invention are included in this PCT application.

There is still a need for new materials for novel and different applications of phase change inks. There is a also a need for relatively low viscosity resins, including non-polymeric resins, and waxes designed for phase change ink jet and other forms of phase change ink printing. These needs are solved by the present invention by providing a means to tailor the properties of these resin and wax isocyanate-derived materials for specific applications.

BRIEF SUMMARY OF THE INVENTION

It is an aspect of the present invention that urethane compounds comprising the reaction product of selected isocyanates with selected alcohols or mixtures of selected alcohols are obtained.

It is another aspect of the present invention that urea compounds comprising the reaction product of selected isocyanates with selected amines or mixtures of selected amines are obtained.

It is still another aspect of the present invention that urethane/urea compounds comprising the reaction product of selected isocyanates with mixtures of selected alcohols and amines are obtained.

It is still a further aspect of the present invention that a phase change ink composition comprising an admixture of (a) a phase change carrier composition containing at least one isocyanate-derived resin or wax, and (b) a phase change ink compatible colorant is obtained.

It is yet another aspect of the present invention that a method for producing a layer of a phase change colored ink on the surface of a substrate by either direct or indirect printing is obtained wherein the phase change ink composition in the solid phase comprises an admixture of (a) a phase change carrier composition containing at least one isocyanate-derived resin or wax and (b) a phase change ink compatible colorant.

It is a feature of the present invention that the colorless isocyanate derived resin or wax reaction product of the selected isocyanates with selected alcohols or mixtures of selected alcohols and/or selected amines or mixtures of selected amines obviates the need for the use of a separate plasticizer when the resin is employed in an ink formulation because the resulting ink is sufficiently malleable and ductile on its own.

It is an advantage of the present invention that the isocyanate-derived resins or waxes can be design engineered to obtain desired properties for specific printing platforms and architectures.

It is another advantage of the present invention that the isocyanate-derived resins or waxes are very pure, being free of salts and other insoluble contaminants.

It is still another advantage of the present invention that the isocyanate-derived resins can be used in combinations with other phase change ink carrier materials to obtain ink compositions that display improved yield stress versus temperature curves over prior art ink compositions.

It is yet another advantage of the present invention that the isocyanate-derived resins are transparent.

It is yet further advantage of the present invention that the isocyanate-derived resins may be substituted for one or more components in prior fatty amide containing phase change inks, such as the tetra-amide, mono-amide, tackifier, or plasticizer components.

These and other aspects, features and advantages are obtained by the use of reaction products of selected isocyanates with selected alcohols and/or amines to produce isocyanate-derived resins or waxes suitable for use in phase change inks that may be employed in direct or indirect printing applications.

BRIEF DESCRIPTION OF THE DRAWING

The aspects, features, and advantages of the invention will become apparent upon consideration of the following detailed disclosure of the invention; especially when it is taken in conjunction of the accompanying drawing wherein.

DESCRIPTION OF THE PREFERRED EMBODIMENTS

Figure 1:
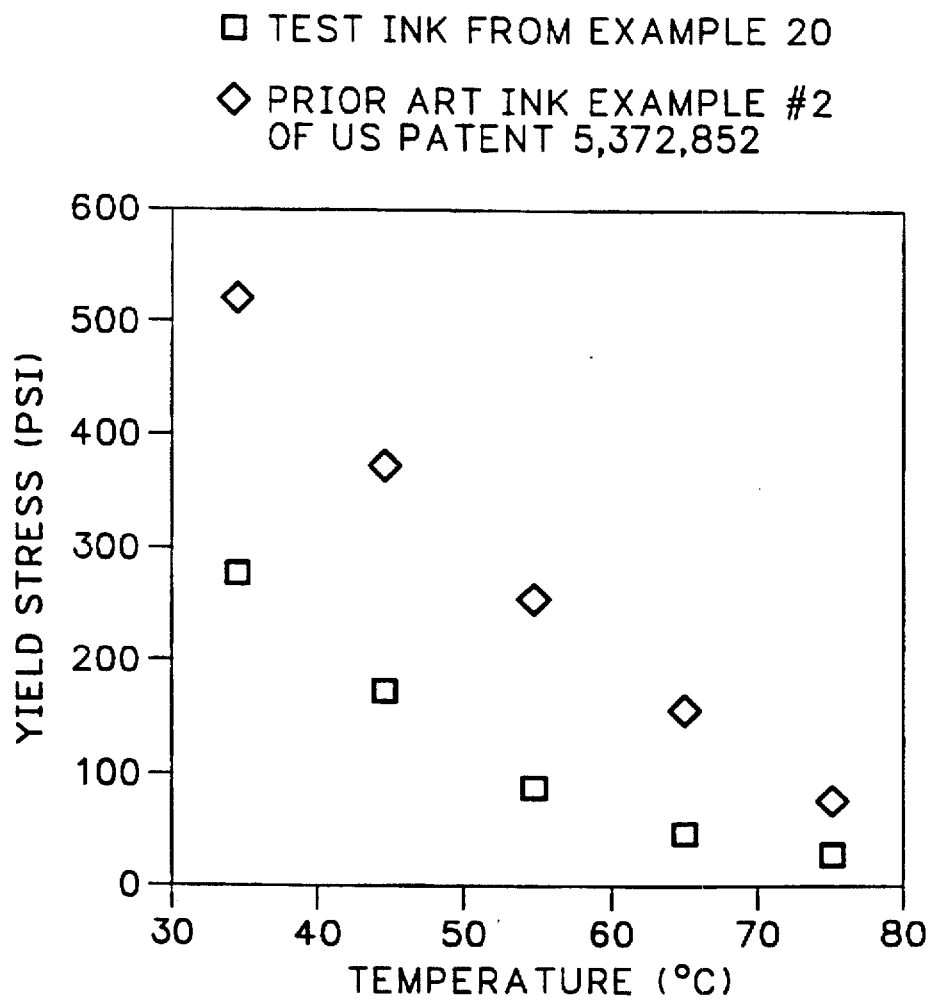
FIG. 1 is a graphical illustration of the yield stress versus temperature curve of ink from Example 20 compared to a prior art phase change ink, wherein the test ink from Example 20 is represented by small squares and the prior art ink is shown by small diamonds.

The term "nucleophile" in the present specification and claims is used as defined on page 179 of "Advanced Organic Chemistry", 3rd Edition by Jerry March, ©1985 by John Wiley and Sons, to describe a reagent that brings an electron pair to a reaction to form a new bond. The preferred nucleophiles of this invention are alcohols or amines, but it is understood that other nucleophilic functional groups that are capable of reacting with the isocyanate moiety could also be used in the invention.

The term "oligomer" in the current specification and claims is used as defined on page 7 of "Polymer Chemistry—The Basic Concepts" by Paul Hiemenz, ©1984 by Marcel Dekker, Inc., to describe a term coined to designate molecules for which n (representing the number of repeating monomer units) is less than 10.

The term "isocyanate-derived resin" as used in the present specification and claims is defined as any monomeric, oligomeric or non-polymeric resinous material derived from the reaction of mono-, di-, or poly-isocyanates with suitable nucleophilic molecules.

The term "isocyanate-derived wax" as used in the present specification and claims is defined as any crystalline or semicrystalline waxy material derived from the reaction of a fatty isocyanate with a suitable nucleophile, or the reaction of a fatty nucleophile with a suitable isocyanate, or the reaction of a fatty nucleophile with a fatty isocyanate.

Any suitable reaction condition for making urethane or urea compounds by condensing alcohols and/or amines with isocyanates may be employed in the practice of the present invention. Preferably, the reaction is carried out at elevated temperatures (e.g. about 60° C. to about 160° C.) in the presence of a urethane reaction catalyst such as dibutyltindilaurate, bismuth tris-neodecanoate, cobalt benzoate, lithium acetate, stannous octoate or triethylamine. The reaction conditions preferably are conducted in an inert atmosphere, such as argon or nitrogen gas or other suitable atmosphere, to prevent oxidizing or yellowing the reaction products and to prevent undesirable side reactions. The mole ratio of reactants is adjusted so that the isocyanate functionalities are completely consumed in the reaction with a slight molar excess of alcohol or amine typically remaining. Conceptually the reactants can be added together in any order and/or added to the reaction as physical mixtures. However, in the preferred embodiments of the invention, reaction conditions and the order of the addition of reactants are carefully controlled for several reasons. First, reaction conditions and reactant additions are chosen to provide a controlled exothermic reaction. Secondly, when reacting mixtures of alcohols and/or amines with diisocyanates such as isophorone diisocyanate (IPDI), the order of addition of the isocyanate and the different nucleophiles to the reaction is chosen to tailor the distribution of diurethane molecules, and/or mixed urethane/urea molecules, and/or diurea molecules in the final resin. When doing this, the different reactivities to isocyanates of alcohols versus amines are employed, as are the different reactivities of the two separate isocyanate groups on IPDI. See J. H. Saunders and K. C. Frisch's "Polyurethanes Part I, Chemistry" published by Interscience of New York, N.Y. in 1962 and Olin Chemicals' Luxate® IM isophorone diisocyanate technical product information sheet which provide further explanation of this chemistry. This control of the reaction conditions and order of addition of the reactants is done to specifically tailor or customize the different types of molecular species in the finished resin so that the resin will:

(1) have a controlled viscosity that is designed for a specific application, (2) have a controlled glass transition temperature and/or melting point, and (3) have consistent properties from batch to batch.

The isocyanate-derived resins from these reactions are generally transparent solids having melting points in the range of about 20° C. to about 150° C., viscosities in the range of about 10 cPs to about 5000 cPs at 150° C. and $T_g$'s of about −30° C. to about 100° C. The isocyanate-derived waxes from these reactions are generally opaque waxy solids having sharp melting points from about 50° C. to about 130° C., and viscosities of about 1 cPs to about 25 cPs at 140° C. The isocyanate-derived resins and waxes display properties such that the higher the $T_g$ and the melting point, the higher is the viscosity. While the structural activity relationships are not fully understood, it is known that the $T_g$ of the isocyanate-derived resins is controlled by the proper choice of the mixture of nucleophiles in the reaction as illustrated in Table 3 below. Varying one or more of the readily available commodity chemicals used as chemical precursors will permit custom-tailoring of the properties of the isocyanate-derived resin and wax materials.

Preferred alcohols to react with difunctional and higher isocyanates to make the isocyanate-derived waxes and resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso)-propanol, (n-, iso-, t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol [e.g., benzyl alcohol, octyl, nonyl, and dodecylphenol alkoxylates of octyl, nonyl, and dodecylphenol, and alkoxyphenol]; aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isobomeol, terpineol, 12-hydroxy stearyl stearamide, and the like). It will be obvious to those skilled in the art that small amounts (on a molar basis) of polyols could also be incorporated into the reaction mixture to produce oligomeric species in the resins if so desired. The preferred alcohols are hydroabietyl alcohol, octylphenol ethoxylate and octadecyl alcohol.

Preferred amines to react with difunctional and higher isocyanates to make the isocyanate-derived waxes and resins of this invention include any monofunctional amine, with the exception of tertiary amines void of other nucleophilic functional groups (e.g., triethylamine). For instance, the monoamine could be any aliphatic primary or secondary amine (e.g., a $C_1$–$C_{22}$ or higher linear amine, any branched amine or any cyclic aliphatic amine) such as methyl amine, ethyl amine, (n- and iso-)propyl amine, (n-, iso-, and t-) butyl amine, (n-, iso-, t-, and the like) pentyl amine, (n-, iso-, t-, and the like) hexyl amine, (n-, iso-,t-, and the like) octyl amine, (n-, iso-, t-, and the like) nonyl amine, (n- and branched) decyl amine, (n- and branched) undecyl amines, (n- and branched) dodecyl amines, (n- and branched) hexadecyl amines, (n- and branched) dodecyl amines, dimethyl amine, diethyl amine, di(n- and iso-)propyl amines, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like)dodecyl amine, di(n-, iso-, t-, and the like)octadecyl amine, cyclohexyl amine, 2,3-dimethyl-1-cyclohexylamine, piperidine, pyrrolidine, and the like; an aliphatic/aromatic amine (e.g., benzyl amine or analogues with longer or additional alkyl chains); aromatic amines such as aniline, anisidine, and the like; fused ring amines such as rosin amine, dehydroabietyl amine, dihydroabietyl amine, hydroabietyl amine, and the like; and miscellaneous amines (e.g., adamantyl amine, isonipecotamide, polyoxyalkylenemonoamines, such as M-series Jeffamines available commercially from Huntsman Chemical Company of Austin, Tex.; 3,3'-diamino-N-methyldipropylamine, and the like. It will be obvious to those skilled in the art that small amounts (on a molar basis) of polyamines could also be incorporated into the reaction mixture to produce oligomeric species in the resins if so desired. The preferred amine is octadecyl amine.

Preferred alcohols to react with monofunctional isocyanates to make the isocyanate-derived waxes and resins of this invention include any monohydric alcohol. For instance, the monohydric alcohol could be any aliphatic alcohol [e.g., a $C_1$–$C_{22}$ or higher linear alcohol, any branched alcohol or any cyclic aliphatic alcohol such as methanol, ethanol, (n- and iso-)propanol, (n-, iso-, and t-) butanol, (n-, iso-, t-, and the like) pentanol, (n-, iso-, t-, and the like) hexanol, (n-, iso-, t-, and the like) octanol, (n-, iso-, t-, and the like) nonanol, (n- and branched) decanols, (n- and branched) undecanols, (n- and branched) dodecanols, (n- and branched) hexadecanols, (n- and branched) octadecanols, 3-cyclohexyl-1-propanol, 2-cyclohexyl-1-ethanol, cyclohexylmethanol, cyclohexanol, 4-methyl cyclohexanol, 4-ethylcyclohexanol, 4-t-butylcyclohexanol, and the like]; an aliphatic/aromatic alcohol (e.g., benzyl alcohol, octyl, nonyl, and dodecylphenol alkoxylates or octyl, nonyl, and dodecylphenol, alkoxyphenol); aromatic alcohols such as phenol, naphthol, and the like, and their derivatives; fused ring alcohols (e.g., rosin alcohols, hydroabietyl alcohol, cholesterol, vitamin E, and the like) and other suitable alcohols (e.g., N,N-dimethyl-N-ethanolamine, stearamide-monoethanolamine, tripropyleneglycol monomethylether, hydroxybutanone, menthol, isobomeol, terpineol, 12-hydroxy stearyl stearamide, and the like), as well as multifunctional alcohols such as ethylene glycol, diethylene glycol, triethylene glycol, dimethylolpropionic acid, sucrose, polytetramethylene glycol (MW<~3000), polypropylene glycol (MW<~3000), polyester polyols (MW<~3000), polyethylene glycol (MW<~3000), pentaerythritol, triethanol amine, glycerin, 1,6-hexanediol, N-methyl-N,N-diethanol amine, trimethylol propane, N,N,N',N'-tetrakis(2-hydroxypropyl)ethylenediamine, and the like. The preferred alcohol is octadecanol.

Preferred amines to react with monofunctional isocyanates to make the isocyanate-derivd waxes and resins of this invention include any monofunctional amine, with the exception of tertiary amines void of other nucleophilic functional groups (e.g., triethylamine). For instance, the monoamine could be any aliphatic primary or secondary amine [e.g., a $C_1$—$C_{22}$ or higher linear amine, any branched amine or any cyclic aliphatic amine such as methyl amine, ethyl amine, (n- and iso-)propyl amine, (n-, iso-, and t-)

butyl amine, (n-, iso-, t-, and the like) pentyl amine, (n-, iso-, t-, and the like) hexyl amine, (n-, iso-, t-, and the like) octyl amine, (n-, iso-, t-, and the like) nonyl amine, (n- and branched) decyl amine, (n- and branched) undecyl amine, (n- and branched) octadecyl amine, (n- and branched) hexadecyl amine, (n- and branched) dodecyl amine, dimethyl amine, diethyl amine, di(n-, and iso-)propyl amine, di(n-, iso-, t-)butyl amine, di(n-, iso-, t-, and the like)pentyl amine, di(n-, iso-, t-, and the like)hexyl amine, di(n-, iso-, t-, and the like)cyclohexyl amine, di(n-, iso-, t-, and the like)heptyl amine, di(n-, iso-, t-, and the like)octyl amine, di(n-, iso-, t-, and the like)decyl amine, di(n-, iso-, t-, and the like) octadecyl amine, di(n-, iso-, t-, and the like)dodecyl amine, cyclohexyl amine, 2,3-dimethyl-1-cyclohexylamine, piperidine, pyrrolidine, and the like]; any aliphatic/aromatic amines (e.g., benzyl amine or analogues with longer or additional alkyl chains); aromatic amines such as aniline, anisidine, and the like; fused ring amines such as rosin amine, dihydroabietyl amine, dehydroabietyl amine, hydroabietyl amine, and the like; and miscellaneous amines (e.g., adamantyl amine, isonipecotamide, polyoxyalkylenemono-, di-, or triamines, such as M-, D-, and T-series Jeffamines available commercially from Huntsman Chemical Company of Austin, Tex.; 3,3'-diamino-N-methyl-dipropylamine, and the like, as well as multifunctional amines such as polyethylene imine; ethylene diamine; hexamethylene diamine; isomers of cyclohexyldiamines; 1,3-pentadiamine; 1,12-dodecanediamine; 3-dimethylaminopropylamine; 4,7,10-trioxa-1,13-tridecanediamine; diethylene triamine; 3,3-diamino-N-methyldipropylamine; tris(2-aminoethyl)amine, and the like. The preferred amine is octadecylamine.

Additionally, hydroxyl/amino containing compounds can be employed (with di- and higher functionality isocyanates taking advantage of the difference in reactivity of the amine over the hydroxyl group, or with monoisocyanates reacting with the amine preferentially or with both the amine and the hydroxyl groups). Examples of this include ethanolamine, diethanolamine, and the like.

Additionally amides or other nucleophile containing compounds can be reacted with the isocyanates (mono, di, and the like). Some examples include: urea, oleamide, stearamide, or the like.

Preferred precursors to the isocyanate-derived resins and waxes of the present invention include mono-, di- and other poly-isocyanates. Examples of monoisocyanates include octadecylisocyanate; octylisocyanate; butyl and t-butylisocyanate; cyclohexyl isocyanate; adamantyl isocyanate; ethylisocyanatoacetate; ethoxycarbonylisocyanate; phenylisocyanate; alphamethylbenzyl isocyanate; 2-phenylcyclopropyl isocyanate; benzylisocyanate; 2-ethylphenylisocyanate; benzoylisocyanate; meta and para-tolylisocyanate; 2-, 3-, or 4-nitrophenylisocyanates; 2-ethoxyphenyl isocyanate; 3-methoxyphenyl isocyanate; 4-methoxyphenylisocyanate; ethyl 4-isocyanatobenzoate; 2,6-dimethylphenylisocyante; 1-naphthylisocyanate; (naphthyl)ethylisocyantes; and the like. Examples of diisocyanates include isophorone diisocyanate (IPDI); toluene diisocyanate (TDI); diphenylmethane-4,4'-diisocyanate (MDI); hydrogenated diphenylmethane-4,4'-diisocyanate ($H_{12}$MDI); tetra-methyl xylene diisocyanate (TMXDI); hexamethylene-1,6-diisocyanate (HDI); hexamethylene-1,6-diisocyanate; napthylene-1,5-diisocyanate; 3,3'-dimethoxy-4,4'-biphenyldiisocyanate; 3,3'-dimethyl-4,4'-bimethyl-4,4'-biphenyldiisocyanate; phenylene diisocyanate; 4,4'-biphenyldiisocyanate; trimethylhexamethylene diisocyanate; tetramethylene xylene diisocyanate; 4,4'-methylenebis(2,6-diethylphenyl isocyanate); 1,12-diisocyanatododecane; 1,5-diisocyanato-2-methylpentane; 1,4-diisocyanatobutane; and cyclohexylene diisocyanate and its isomers; uretidione dimers of HDI; and the like. Examples of triisocyanates or their equivalents include the trimethylolpropane trimer of TDI, and the like, isocyanurate trimers of TDI, HDI, IPDI, and the like, and biuret trimers of TDI, HDI, IPDI, and the like. Examples of higher isocyanate functionalities include copolymers of TDI/HDI, and the like, as well as MDI oligomers.

Phase change inks of this invention contain a phase change carrier system or composition. The phase change carrier composition is generally designed for use in either a direct printing mode or use in an indirect or offset printing transfer system. In the direct printing mode, the phase change carrier composition is generally made up of one or more chemicals that provide the necessary properties to allow the phase change ink (1) to be applied in a thin film of uniform thickness on the final receiving substrate when cooled to the ambient temperature after printing directly to the substrate; (2) to be ductile while retaining sufficient flexibility so that the applied image on the substrate will not fracture upon bending; and (3) to possess a high degree of lightness, chroma, transparency and thermal stability. In an offset printing transfer or indirect printing mode, the phase change carrier composition is designed to possess not only the above mentioned properties, but certain fluidic and mechanical properties necessary for use in such a system, as described in U.S. Pat. No. 5,389,958 which is hereby incorporated by reference in pertinent part. The phase change inks of the current invention incorporate isocyanate-derived waxes and isocyanate-derived resins as all or as part of the carrier composition and can be a supplemental ingredient or supplemental ingredients to the existing commercial phase change carrier composition. The isocyanate-derived materials of the current invention are tailored to have the desirable properties mentioned above when used in the carrier composition of the inks of the present invention by varying one or more of the readily available commodity chemical precursors.

The phase change carrier compositions of the current invention may be used in combination with conventional phase change ink colorant materials such as Color Index (C.I.) Solvent Dyes, Disperse Dyes, modified Acid and Direct Dyes, Basic Dyes, Sulphur Dyes, Vat Dyes, and/or polymeric dyes such as those disclosed in U.S. patent application Ser. No. 08/381,610, and/or pigments. They may also be used in combination with the isocyanate-derived colored resins of co-pending U.S. patent application Ser. No. 08/672,617, filed concurrently herewith and assigned to the assignee of the present invention, to produce a phase change ink.

Prior art phase change inks for use in direct and indirect transfer printing systems are described in U.S. Pat. Nos. 4,889,560 and 5,372,852. These inks consist of a phase change ink carrier composition comprising one or more fatty amide-containing materials, usually consisting of a monoamide wax and a tetra- amide resin, one or more tackifiers, one or more plasticizers and one or more antioxidants, in combination with compatible colorants. A preferred tetra-amide resin is a dimer acid based tetra-amide that is the reaction product of dimer acid, ethylene diamine, and stearic acid. A preferred mono-amide is stearyl stearamide. A preferred tackifier resin is a glycerol ester of hydrogenated abietic (rosin) acid and a preferred antioxidant is that provided by Uniroyal Chemical Company under the tradename Naugard 524. The isocyanate-derived resins and/or isocyanate-derived waxes of the present invention replace one or more of the ingredients in the above phase change ink carrier composition or the inks of the present invention can have all of the above ingredients replaced by the isocyanate-derived resins and/or waxes of the present invention. The advantages of inks formulated with isocyanate-derived resins and/or isocyanate-derived waxes over the prior art phase change inks are:

(1) The isocyanate-derived resins and waxes of this invention are very pure, being free of salts and other insoluble contaminants. This makes the inks made from these materials easy to filter and provides for high reliability in ink jet printing devices. This is a major advantage.

(2) The isocyanate-derived resins and waxes of this invention are specifically tailored to give certain physical properties that optimize the performance of the inks of this invention in ink jet printing devices and on the output substrate. These desirable ink properties include melting point, viscosity, transparency and the dynamic mechanical properties referenced in the aforementioned U.S. Pat. No. 5,389,958.

(3) The isocyanate-derived resins of this invention can be used in certain combinations with other phase change ink carrier materials to give ink compositions that display an improved yield stress versus temperature curve over prior art ink compositions. This enables ink droplets to be spread and fused at elevated temperatures during the fusing and transfer steps in an indirect printing process, but at a lower pressure than was possible with prior art inks.

Many other patents describe other materials for use in phase change ink jet inks. Some representative examples include U.S. Pat. Nos. 3,653,932; 4,390,369; 4,484,948; 4,684,956; 4,851,045; 5,006,170; 5,151,120; EP Application Nos. 0187352 and 0206286; and PCT Patent Application WO 94/04619. These other materials can include paraffins, microcrystalline waxes, polyethylene waxes, ester waxes, amide waxes, fatty acids, fatty alcohols, fatty amides and other waxy materials, sulfonamide materials, resinous materials made from different natural sources (tall oil rosins and rosin esters are an example) and many synthetic resins, oligomers, polymers, co-polymers, and ionomers. It will be obvious to those skilled in the art that the isocyanate-derived materials of this invention could be used in inks made from many different combinations of these materials.

The aforementioned U.S. Pat. No. 5,496,879 and German patent publications DE 4205636AL and DE 4205713AL, assigned to Siegwerk Farbenfabrik Keller, Dr. Rung and Co., describe materials used for phase change or hot melt gravure printing. It will be obvious to those skilled in the art that the isocyanate-derived materials of this current invention would be compatible with those materials and could also be used in that application or other similar printing methods that employ hot melt ink technology.

It also will be obvious to those skilled in the art that other ink colors besides the subtractive primary colors are desirable for applications, such as postal marking or industrial marking and labeling using phase change printing, and that this invention is applicable to these needs. Infrared (IR) or ultraviolet (UV) absorbing dyes can also be incorporated into the inks of this invention for use in applications such as "invisible" coding or marking of products.

The inks of the present invention can be equally well employed in apparatus for direct or indirect (offset) printing applications. When employed in direct printing applications a suitable method of printing or producing a layer of a phase change colored ink directly on the surface of a substrate can comprise:

(1) forming a phase change ink composition in the solid phase, comprising an admixture of (a) a phase change carrier composition containing at least one isocyanate-derived resin or wax and (b) a phase change compatible colorant.

(2) transferring the solid phase, phase change colored ink composition to a phase change ink application means or print head;

(3) raising the operating temperature of the application means or print head to a level whereby a liquid phase, phase change colored ink composition is formed;

(4) providing a substrate in proximity to the application means;

(5) applying a predetermined pattern of the liquid phase, phase change colored ink composition to at least one surface of the substrate; and (6) lowering the temperature of the applied ink composition to form a solid phase, phase change ink pattern on the substrate.

An appropriate direct printing process is described in greater detail in U.S. Pat. No. 5,195,430.

When employed in indirect or offset printing applications a suitable method of printing or producing a layer of a phase change colored ink indirectly on the surface of a substrate by transferring from an intermediate transfer surface can comprise:

(1) forming a phase change ink composition in the solid phase, comprising an admixture of (a) a phase change carrier composition containing at least one isocyanate-derived resin or wax and (b) a phase change compatible colorant.

(2) transferring the solid phase, phase change colored ink composition to a phase change ink application means or a print head;

(3) raising the operating temperature of the application means or print head to a level whereby a liquid phase, phase change colored ink composition is formed;

(4) providing an intermediate transfer surface in proximity to the application means;

(5) applying a predetermined pattern of the liquid phase, phase change colored ink composition to the intermediate transfer surface;

(6) lowering the temperature of the applied ink composition to form a solid phase, phase change ink pattern on the intermediate transfer surface at a second, intermediate temperature;

(7) transferring said phase change ink composition from the intermediate transfer surface to a final substrate; and (8) fixing the phase change ink composition to the substrate to form a printed substrate, the phase change ink composition having (a) a compressive yield strength which will allow it to be malleable to spread and deform without an increase in stress when compressive forces are applied thereto at the second operating temperature, and sufficient internal cohesive strength to avoid shear banding and weak behavior when said phase change ink composition is transferred and fixed to said substrate, and (b) a ductility on the substrate after fixing.

An appropriate offset or indirect printing process is described in greater detail in U.S. Pat. No. 5,389,958.

The present invention is further described in detail by means of the following Examples and Comparisons. All parts and percentages are by weight and all temperatures are degrees Celsius unless explicitly stated otherwise. It is to be noted that while the following examples may recite only one colorant, it is to be understood that each individual example is only illustrative and any of the primary colorants (cyan, yellow, magenta and black) used in subtractive color printing could be employed in each instance.

EXAMPLE 1

The Reaction Product of Hydroabietyl Alcohol and Isophorone Diisocyanate

About 391.9 grams (1.351 moles) of Abitol E hydroabietyl alcohol[1] was added to a 1000 ml four-neck resin kettle equipped with a Trubore stirrer, an $N_2$ atmosphere inlet, 200 ml addition funnel, and a thermocouple-temperature controller. The kettle was heated to about 100° C. with stirring under an $N_2$ atmosphere and about 150.0 grams (0.676 moles) of isophorone diisocyanate[2] was added to the addition funnel. About 0.50 grams of dibutyltindilaurate[3] catalyst was added to the Abitol E, followed by dropwise addition of the isophorone diisocyanate over 3 hours. The temperature was gradually increased to about 155° C. during this 3 hour period. After an additional 2 hours at about 155° C., a Fourier Transform Infrared Spectroscopy (FT-IR) of the product was run to insure all of the isocyanate (NCO) was consumed. The absence (disappearance) of a peak at about 2285 $cm^{-1}$ (NCO) and the appearance (or increase in magnitude) of peaks at about 1740–1680 $cm^{-1}$ and about 1540–1530 $cm^{-1}$ corresponding to urethane frequencies were used to confirm this. The final di-urethane resin product was poured into aluminum molds and allowed to cool and harden. This final product was a clear solid resin at room temperature characterized by the following physical properties: viscosity of about 4,072.9 cPs as measured by a Ferranti-Shirley cone-plate viscometer at about 140° C., a melting point of from about 72.0° C. to about 76.0° C. as measured by an electrothermal capillary melting point apparatus, and a $T_g$ of about 48° C. as measured by differential scanning calorimetry using a DuPont 2100 calorimeter at a scan rate of 20° C./minute.

[1]Abitol E—Hydroabietyl alcohol available from Hercules Inc. of Wilmington, Del.
[2]Desmodur I—Isophorone Diisocyanate available from Bayer Corp. of Pittsburg, Pa.
[3]Dibutyltindilaurate available from Aldrich Chemicals of Milwaukee, Wisc.

EXAMPLE 2

The Reaction Product of 1.5 Parts Hydroabietyl Alcohol, 0.5 Parts Octadecyl Amine, and Isophorone Diisocyanate About 240.2 grams (0.676 moles) of hydroabietyl alcohol[1] was added to a 1000ml four-neck resin kettle equipped with a Trubore stirrer, an $N_2$ atmosphere inlet, 200 ml addition funnel, and a thermocouple-temperature controller. About 100.0 grams (0.45 moles) of isophorone diisocyanate[2] was added to the addition funnel. Agitation of the hydroabietyl alcohol first was begun and then all of the isophorone diisocyanate was added over approximately 5 minutes. About 0.22 grams of dibutyltindilaurate[3] catalyst was added and the reaction mixture heated to about 125° C. under an $N_2$ atmosphere. After 4 hours at about 125° C., about 59.95 grams (0.225 moles) of octadecyl amine[4] was added and the temperature raised to about 150° C. and held for approximately 2 hours. An FT-IR of the reaction product was run to insure all of the NCO functionality was consumed. The absence (disappearance) of a peak at about 2285 $cm^{-1}$ (NCO) and the appearance (or increase in magnitude) of peaks at about 1705–1635 $cm^{-1}$ and about 1515–1555 $cm^{-1}$ corresponding to urea frequencies and about 1740–1680 $cm^{-1}$ and about 1540–1530 $cm^{-1}$ corresponding to urethane frequencies were used to confirm this. The final mixed urethane/urea resin product was poured into aluminum molds and allowed to cool and harden. This final product was a clear solid resin at room temperature characterized by the following physical properties: viscosity of about 314.8 cPs as measured by a Ferranti-Shirley cone-plate viscometer at about 140° C., a melting point of from about 67.9° C. to about 87.0° C. as measured by an electrothermal capillary melting point apparatus, and a $T_g$ of about 23° C. as measured by differential scanning calorimetry using a DuPont 2100 calorimeter at a scan rate of 20° C./minute.

[1]Abitol E—Hydroabietyl alcohol available from Hercules Inc. of Wilmington, Del.
[2]Desmodur I—Isophorone diisocyanate available from Bayer Corp. of Pittsburg, Pa.
[3]Dibutyltindilaurate available from Aldrich Chemicals of Milwaukee, Wisc.
[4]Octadecyl amine (technical grade) available from ACROS Organics of New Jersey.

EXAMPLE 3

The Reaction Product of 1.25 Parts Hydroabietyl Alcohol,0.75 Parts Octadecyl Amine and Isophorone Diisocyanate About 150.1 grams (0.422 moles) of hydroabietyl alcohol[1] and about 75.0 grams (0.338 moles) of isophorone diisocyanate[2] were added to a 500ml three-neck resin kettle equipped with a Trubore stirrer, an $N_2$ atmosphere inlet, and a thermocouple-temperature controller. Agitation was begun and then about 0.22 grams of dibutyltindilaurate[3] catalyst was added and the reaction mixture heated to about 130° C. under an $N_2$ atmosphere. After 4 hours at about 130° C., about 67.45 grams (0.253 moles) of octadecyl amine[4] was added and the temperature raised to about 150° C. and held for approximately 2 hours. An FT-IR of the reaction product was run to insure all of the NCO functionality consumed. The absence (disappearance) of a peak at about 2285 $cm^{-1}$ (NCO) and the appearance (or increase in magnitude) of peaks at about 1705–1635 $cm^{-1}$ and about 1515–1555 $cm^{-1}$ corresponding to urea frequencies and about 1740–1680 $cm^{-1}$ and about 1540–1530 $cm^{-1}$ corresponding to urethane frequencies were used to confirm this. The final mixed urethane/urea resin product was then poured into aluminum molds and allowed to cool and harden. This final product was a clear solid resin at room temperature characterized by the following physical properties: viscosity of about 275.0 cPs as measured by a Ferranti-Shirley cone-plate viscometer at about 140° C., a melting point of from about 68.4° C. to about 89.0° C. as measured by an electrothermal capillary melting point apparatus, and a $T_g$ of about 17° C. as measured by differential scanning calorimetry using a DuPont 2100 calorimeter at a scan rate of 20° C./minute.

[1]Abitol E—Hydroabietyl alcohol available from Hercules Inc. of Wilmington, Del.
[2]Desmodur I—Isophorone diisocyanate available from Bayer Corp. of Pittsburg, Pa.
[3]Dibutyltindilaurate available from Aldrich Chemicals of Milwaukee, Wisc.
[4] Octadecyl amine (technical grade) available from ACROS Organics of New Jersey.

EXAMPLE 4

The Reaction Product of 1 Part Hydroabietyl Alcohol, 1 Part Octadecyl Amine and Isophorone Diisocyanate About 120.1 grams (0.338 moles) of hydroabietyl alcohol[1] and about 75.0 grams (0.338 moles) of isophorone diisocyanate[2] was added to a 500ml three-neck resin kettle equipped with a Trubore stirrer, an N2 atmosphere inlet, and a thermocouple-temperature controller. Agitation was begun, and then about 0.22 grams of dibutyltindilaurate[3] catalyst was added and the reaction mixture heated to about 90° C. under an $N_2$ atmosphere. After 1 hour at about 90° C. the temperature was increased to about 110° C. and held for 2 hours. About 89.93 grams (0.338 moles) of octadecyl amine[4] was added and the temperature raised to about 130° C. and held for approximately 2 hours. An FT-IR of the reaction product was run to insure all of the NCO functionality was consumed. The absence (disappearance) of a peak at about 2285 cm$^{-1}$ (NCO) and the appearance (or increase in magnitude) of peaks at about 1705–1635 cm$^{-1}$ and about 1515–1555 cm$^{-1}$ corresponding to urea frequencies and about 1740–1680 cm$^{-1}$ and about 1540–1530 cm$^{-1}$ corresponding to urethane frequencies were used to confirm this. The final mixed urethane/urea resin product was poured into aluminum molds and allowed to cool and harden. This final product was a clear solid resin at room temperature characterized by the following physical properties: viscosity of about 15.7 cPs as measured by a Ferranti-Shirley cone-plate viscometer at about 140° C., a melting point of from about 73.2° C. to about 1 10° C. as measured by an electrothermal capillary melting point apparatus, and a $T_g$ of about 16° C. as measured by differential scanning calorimetry using a DuPont 2100 calorimeter at a scan rate of 20° C./minute.

[1]Abitol E—Hydroabietyl alcohol available from Hercules Inc. of Wilmington, Del.
[2]Desmodur I—Isophorone diisocyanate available from Bayer Corp. of Pittsburg, Pa.
[3]Dibutyltindilaurate available from Aldrich Chemicals of Milwaukee, Wisc.
[4]Octadecyl amine (technical grade) available from ACROS Organics of New Jersey.

EXAMPLE 5

The Reaction Product of Octyiphenol Ethoxylate and Isophorone Diisocyanate

About 450.4 grams (1.802 moles) of Triton X15 octylphenol ethoxylate[1] and about 200.0 grams (0.901 moles) of isophorone diisocyanate[2] was added to a 1000 ml three-neck resin kettle equipped with a Trubore stirrer, an $N_2$ atmosphere inlet, and a thermocouple-temperature controller. The mixture was agitated for 10 minutes and then about 0.33 grams of dibutyltindilaurat[3] catalyst was added and the reaction mixture heated to about 150° C. under an $N_2$ atmosphere. After 5.5 hours at about 150° C. an FT-IR of the product was run to insure all of the NCO was consumed. The absence (disappearance) of a peak at about 2285 cm$^{-1}$ (NCO) and the appearance (or increase in magnitude) of peaks at about 1740–1680 cm$^{-1}$ and about 1540–1530 cm$^{-1}$ corresponding to urethane frequencies were used to confirm this. The final di-urethane resin product was poured into aluminum molds and allowed to cool and harden. This final product was a clear solid resin at room temperature characterized by the following physical properties: viscosity of about 124.7 cPs as measured by a Ferranti-Shirley cone-plate viscometer at about 140° C., a melting point of from about 51.3° C. to about 81.9° C. as measured by an electrothermal capillary melting point apparatus, and a $T_g$ of about 36° C. as measured by differential scanning calorimetry using a DuPont 2100 calorimeter at a scan rate of 20° C./minute.

[1]Triton X15 octylphenol ethoxylate is available from Union Carbide Chemicals and Plastics Company Inc. of Danbury, Conn. Note: IGEPAL CA-210 octylphenol ethoxylate, available from Rhone-Poulenc Co., Cranbury, N.J., can be directly substituted for Triton X15 in this reaction.
[2]VESTANAT IPDI—Isophorone diisocyanate available from Huls America, Inc. of Piscataway, N.J.
[3]Dibutyltindilaurate available from Aldrich Chemicals of Milwaukee, Wisc.

EXAMPLE 6

The Reaction Product of Octadecyl Alcohol, Octadecyl Amine and Isophorone Diisocyanate About 243.2 grams (0.901 moles) of octadecyl alcohol[1] and about 200.0 grams (0.901 moles) of isophorone diisocyanate[2] were added to a 1000 ml three-neck resin kettle equipped with a Trubore stirrer, an $N_2$ atmosphere inlet, and a thermocouple-temperature controller. Agitation was begun and then about 0.33 grams of dibutyltindilaurate[3] catalyst was added and the reaction mixture heated to about 90° C. under an $N_2$ atmosphere. After 4 hours the temperature was raised to about 120° C. and about 239.8 grams (0.901 moles) of octadecyl amine[4] was added over 15 minutes. The temperature was raised to about 150° C. and held for approximately 4 hours. An FT-IR of the product was run to insure all of the NCO functionality was consumed. The absence (disappearance) of a peak at about 2285 cm$^{-1}$ (NCO) and the appearance (or increase in magnitude) of peaks at about 1705–1635 cm$^{-1}$ and about 1515–1555 cm$^{-1}$ corresponding to urea frequencies and about 1740–1680 cm$^{-1}$ and about 1540–1530 cm$^{-1}$ corresponding to urethane frequencies were used to confirm this. The final mixed urethane/urea resin product was poured into aluminum molds and allowed to cool and harden. This final product was a clear solid resin at room temperature characterized by the following physical properties: viscosity of about 39.9 cPs as measured by a Ferranti-Shirley cone-plate viscometer at about 140° C., a melting point of from about 63.2° C. to about 92.0° C. as measured by an electrothermal capillary melting point apparatus, and a $T_g$ of about –29° C. as measured by differential scanning calorimetry using a DuPont 2100 calorimeter at a scan rate of 20° C./minute.

[1]Octadecyl alcohol available from Aldrich Chemicals of Milwaukee, Wisc.
[2]Desmodur I—Isophorone diisocyanate available from Bayer Corp. of Pittsburg, Pa.
[3]Dibutyltindilaurate available from Aldrich Chemicals of Milwaukee, Wisc.
[4]Octadecyl amine (technical grade) available from ACROS Organics of New Jersey.

EXAMPLE 7

The Reaction Product of Octadecyl Alcohol and Isophorone Diisocyanate

About 103.14 grams (0.382 moles, 0.382 equiv.) of octadecyl alcohol[1] was added to a 500 ml four-neck resin kettle equipped with a Trubore stirrer, an $N_2$ atmosphere inlet, a 200 ml addition funnel, and a thermocouple-temperature controller. The kettle was heated to about 80° C. with stirring under an $N_2$ atmosphere and about 42.4 grams (0.191 moles, 0.382 equiv.) of isophorone diisocyanate[2] was added to the addition funnel. Isophorone diisocyanate was then added dropwise over 1 hour at about 80° C. The temperature was increased to about 120° C. and held for 3 hours. An FT-IR of the product was run to insure all of the NCO functionality was consumed. The absence (disappearance) of a peak at 2285 cm$^{-1}$ (NCO) and the appearance (or increase in magnitude) of peaks at 1740–1680 cm$^{-1}$ and 1540–1530 cm$^{-1}$ corresponding to urethane frequencies were used to confirm this. The final di-urethane resin product was poured into aluminum molds and allowed to cool and harden. This final product was a clear solid resin at room temperature characterized by the following physical properties: viscosity of about 10.8 cPs as measured by a Ferranti-Shirley cone-plate viscometer at about 140° C., and a melting point of about 51.2° C. as measured by an electrothermal capillary melting point apparatus. An attempt was made to measure the $T_g$ using differential scanning calorimetry with a DuPont 2100 calorimeter at a scan rate of 20° C./minute, but the $T_g$ was determined not to be measurable.

[1]Octadecyl alcohol available from Aldrich Chemicals of Milwaukee, Wisc.
[2]Desmodur I—Isophorone diisocyanate available from Bayer Corp. of Pittsburg, Pa.

EXAMPLE 8

The Reaction Product of Octadecyl Amine and Isophorone Diisocyanate

About 359.7 grams (1.351 moles) of octadecyl amine[1] was added to a 1000ml four-neck resin kettle equipped with a Trubore stirrer, an $N_2$ atmosphere inlet, addition funnel (200 ml), and thermocouple-temperature controller. The kettle was heated to about 70° C. with stirring under an $N_2$ atmosphere and about 150 grams (0.676 moles) of isophorone diisocyanate[2] was added to the addition funnel. Isophorone diisocyanate was then added dropwise to the octadecyl amine over 2 hours with the temperature gradually increased to about 165° C. as the viscosity increased. The contents were held at about 165° C. for 1 hour and an FT-IR of the product was run to insure all of the NCO functionality was consumed. The absence (disappearance) of a peak at about 2285 cm$^{-1}$ (NCO) and the appearance (or increase in magnitude) of peaks at about 1705–1635 cm$^{-1}$ and about 1515–1555 cm$^{-1}$ corresponding to urea frequencies were used to confirm this. The final di-urea resin product was poured into aluminum molds and allowed to cool and harden. This final product was a clear solid resin at room temperature characterized by the following physical properties: viscosity of about 988.0 cPs as measured by a Ferranti-Shirley cone-plate viscometer at about 140° C., a melting point of from about 84.4° C. to about 93.9° C. as measured by an electrothermal capillary melting point apparatus, and a $T_g$ of about –14° C. as measured by differential scanning calorimetry using a DuPont 2100 calorimeter at a scan rate of 20° C./minute.

[1]Octadecyl amine (technical grade) available from ACROS Organics of New Jersey.
[2]Desmodur I—Isophorone diisocyanate available from Bayer Corp. of Pittsburg, Pa.

EXAMPLE 9

The Reaction Product of Octadecyl Amine and Octadecylisocyanate

About 250.0 grams (0.877 moles) of octadecylisocyanate[1] and about 233.3 grams (0.877 moles) of octadecylamine[2] were added to a 1000 ml three-neck resin kettle equipped with a Trubore stirrer, an $N_2$ atmosphere inlet, and thermocouple-temperature controller. The kettle was heated to about 130° C. with stirring under an $N_2$ atmosphere and held for 6 hours. An FT-IR of the product was run to insure all of the NCO functionality was consumed. The absence (disappearance) of a peak at about 2285 cm$^{-1}$ (NCO) and the appearance (or increase in magnitude) of peaks at about 1705–1635 cm$^{-1}$ and about 1515–1555 cm$^{-1}$ corresponding to urea frequencies were used to confirm this. The final mono-urea wax product was poured into aluminum molds and allowed to cool and harden. This final product was a white waxy solid at room temperature characterized by the following physical properties: viscosity of about 13.2 cPs as measured by a Ferranti-Shirley cone-plate viscometer at about 140° C., and a melting point of from about 113.4° C. to about 113.6° C. as measured by an electrothermal capillary melting point apparatus.

[1]Mondur O—Octadecylisocyanate available from Bayer Corp. of Pittsburg, Pa.
[2]Octadecyl amine (technical grade) available from ACROS Organics of New Jersey.

EXAMPLE 10

The Reaction Product of Octadecyl Alcohol and Octadecylisocyanate

About 250.0 grams (0.877 moles) of octadecylisocyanate[1] and about 236.7 grams (0.867 moles) of octadecyl alcohol[2] was added to a 1000 ml three-neck resin kettle equipped with a Trubore stirrer, an $N_2$ atmosphere inlet, and a thermocouple-temperature controller. The kettle was heated to about 120° C. with stirring under an $N_2$ atmosphere and about 0.5 grams of dibutyltindilaurate[3] catalyst was added. The reaction mixture was heated at about 120° C. for approximately 4 hours, then increased to about 140° C. and held for 2 hours. An FT-IR of the product was run to insure all of the NCO functionality was consumed. The absence (disappearance) of a peak at about 2285 cm$^{-1}$ (NCO) and the appearance (or increase in magnitude) of peaks at about 1740–1680 cm$^{-1}$ and about 1540–1530 cm$^{-1}$ corresponding to urethane frequencies were used to confirm this. The final mono-urethane wax product was poured into aluminum molds and allowed to cool and harden. This final product was a white waxy solid at room temperature characterized by the following physical properties: viscosity of about 3.7 cPs as measured by a Ferranti-Shirley cone-plate viscometer at about 140° C., and a melting point of from about 84.5° C. to about 87.7° C. as measured by an electrothermal capillary melting point apparatus.

[1]Mondur O—Octadecylisocyanate available from Bayer Corp. of Pittsburg, Pa.
[2]Alfol 18 Alcohol (octadecyl alcohol) available from Vista Chemical Company of Houston, Tex.
[3]Dibutyltindilaurate available from Aldrich Chemicals of Milwaukee, Wisc.

EXAMPLE 11

Cyan Ink Made From Mono-Amide Wax, Urethane Resin and Tackifier Resin

About 62.5 grams of the di-urethane resin reaction product from Example 5, about 62.5 grams of a rosin ester tackifier resin available commercially as Arakawa KE-100[1], about 125 grams of stearyl stearamide available commercially as Witco S-180[2] and about 0.4 grams of Uniroyal Naugard 445 antioxidant[3] were combined in a stainless steel beaker. The materials were melted together at a temperature of about 140° C. in an oven, then blended by stirring in a temperature controlled mantle at about 115° C. for about ½ hour. To this mixture was added about 5 grams of Solvent Blue 44. After stirring for about ½ hour, the cyan ink was filtered through a heated Mott apparatus (available from Mott Metallurgical) using #3 Whatman filter paper and a pressure of 15 psi. The filtered phase change ink was poured into molds and allowed to solidify to form ink sticks. This final ink product was characterized by the following physical properties: viscosity of about 12.4 cPs as measured by a Ferranti-Shirley cone-plate viscometer at about 140° C., a melting point of about 90° C. as measured by differential scanning calorimetry using a DuPont 2100 calorimeter, and a $T_g$ of about 42° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 2705 milliliters·Absorbance Units per gram at λmax.

[1]KE-100—Glycerol ester of hydrogenated abietic (rosin) acid available from Arakawa Chemical Industries, Ltd. of Osaka, Japan.
[2]Kemamide S-180—Stearyl stearamide available from Witco Chemical Company of Memphis, Tenn.
[3]Naugard 445—antioxidant available from Uniroyal Chemical Company of Oxford, Conn.

EXAMPLE 12

Cyan Ink Made From Amide Wax, Mixed Urethane/Urea Resin and Tackifier Resin In a stainless steel beaker were combined about 62.5 grams of the reaction product mixture of urethane/urea resin material from Example 6, about 65 grams of a rosin ester tackifier resin available commercially as Arakawa KE-100[1], about 120 grams of Witco S-180[2] stearyl stearamide and 0.4 grams of Uniroyal Naugard 445 antioxidant[3]. The materials were melted together at a temperature of about 140° C. in an oven, then blended by stirring in a temperature controlled mantle at about 115° C. for about ½ hour. To this mixture was added about 5 grams of Solvent Blue 44. After stirring for about ½ hour, the cyan ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 12.9 cPs as measured by a Ferranti-Shirley cone-plate viscometer at about 140° C., a melting point of about 88° C. as measured by differential scanning calorimetry using a DuPont 2100 calorimeter, and a $T_g$ of about 41° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 2698 milliliters·Absorbance Units per gram at λmax.

[1]KE-100—Glycerol ester of hydrogenated abietic (rosin) acid available from Arakawa Chemical Industries, Ltd. of Osaka, Japan.
[2]Kemamide S-180—Stearyl stearamide available from Witco Chemical Company of Memphis, Tenn.
[3]Naugard 445—antioxidant available from Uniroyal Chemical Company of Oxford, Conn.

EXAMPLE 13

Cyan Ink Made From Amide Wax, Urethane Resin and Tackifier Resin

In a stainless steel beaker were combined about 57.5 grams of the di-urethane resin reaction product from Example 1, about 57.5 grams of a rosin ester tackifier resin available commercially as Arakawa KE-100[1], about 135 grams of Witco S-180 stearyl stearamide[2] and about 0.5 grams of Uniroyal Naugard 445 antioxidant[3]. The materials were melted together at a temperature of about 140° C. in an oven, then blended by stirring in a temperature controlled mantle at about 115° C. for about ½ hour. To this mixture was added about 5 grams of Solvent Blue 44. After stirring for about ½ hour, the cyan ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 13.2 cPs as measured by a Ferranti-Shirley cone-plate viscometer at about 140° C., a melting point of about 90° C. as measured by differential scanning calorimetry using a DuPont 2100 calorimeter, and a $T_g$ of about 49° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 2721 milliliters·Absorbance Units per gram at λmax.

[1]KE-100—Glycerol ester of hydrogenated abietic (rosin) acid available from Arakawa Chemical Industries, Ltd. of Osaka, Japan.
[2]Kemamide S-180—Stearyl stearamide available from Witco Chemical Company of Memphis, Tenn.
[3]Naugard 445—antioxidant available from Uniroyal Chemical Company of Oxford, Conn.

EXAMPLE 14

Cyan Ink Made From Amide Wax, Urethane Resin and Urea Resin

About 56.25 grams of the di-urethane resin reaction product from Example 5, about 56.25 grams of the di-urea resin reaction product from Example 8, about 137.5 grams of Witco S-180 stearyl stearamide[1] and about 0.5 grams of Uniroyal Naugard 445 antioxidant[2] were combined in a stainless steel beaker. The materials were melted together at a temperature of about 140° C. in an oven, then blended by stirring in a temperature controlled mantle at about 115° C. for about ½ hour. To this mixture was added about 5 grams of Solvent Blue 44. After stirring for about ½ hr., the cyan ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 14.1 cPs as measured by a Ferranti-Shirley cone-plate viscometer at about 140° C., a melting point of about 90° C. as measured by differential scanning calorimetry using a DuPont 2100 calorimeter, and a $T_g$ of about 30° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 2690 milliliters·Absorbance Units per gram at λmax.

[1]Kemamide S-180—Stearyl stearamide available from Witco Chemical Company of Memphis, Tenn.
[2]Naugard 445—antioxidant available from Uniroyal Chemical Company of Oxford, Conn.

EXAMPLE 15

Cyan Ink Made From Amide Wax, Urethane Resin and Mixed Urethane/Urea Resin

About 70 grams of the reaction product urethane material from Example 5, about 70 grams of the reaction product urethane/urea mixture material from Example 6, about 110 grams of Witco S-180 stearyl stearamide[1] and about 0.5 grams of Uniroyal Naugard 445 antioxidant[2] were combined in a stainless steel beaker. The materials were melted together at a temperature of about 140° C. in an oven, then blended by stirring in a temperature controlled mantle at about 115° C. for about ½ hour. To this mixture was added about 5 grams of Solvent Blue 44. After stirring for about ½ hour, the cyan ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 12.9 cPs as measured by a Ferranti-Shirley cone-plate viscometer at about 140° C., a melting point of about 88° C. as measured by differential scanning calorimetry using a DuPont 2100 calorimeter, and a $T_g$ of about 24° C. as measured by Dynamic Mechanical Analysis using a Rheometrics Solids Analyzer (RSAR). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 2714 milliliters·Absorbance Units per gram at λmax.

[1]Kemamide S-180—Stearyl stearamide available from Witco Chemical Company of Memphis, Tenn.
[2]Naugard 445—antioxidant available from Uniroyal Chemical Company of Oxford, Conn.

EXAMPLE 16

Yellow Ink Made From Urethane Wax, Urethane Resin, Tackifier Resin and Polymeric Dye In a stainless steel beaker were combined about 77.8 grams of the reaction product urethane material from Example 5, about 77.7 grams of a rosin ester tackifier resin available commercially as Arakawa KE-100[1], about 132.5 grams of the reaction product mono-urethane wax material from Example 10 (stearyl stearurethane) and about 0.5 grams of Uniroyal Naugard 445 antioxidant. The materials were melted together at a temperature of about 140° C. in an oven, then blended by stirring in a temperature controlled mantle at about 115° C. for about ½ hour. To this mixture was added about 11.6 grams of Milliken Chemical Y869 polymeric colorant. After stirring for about 1/2 hour, the yellow ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 11.8 cPs as measured by a Ferranti-Shirley cone-plate viscometer at about 140° C. and a melting point of about 80° C. as measured by differential scanning calorimetry using a DuPont 2100 calorimeter. The $T_g$ of the final ink product was not measured. The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 726 milliliters·Absorbance Units per gram at λmax.

[1]KE-100—Glycerol ester of hydrogenated abietic (rosin) acid available from Arakawa Chemical Industries, Ltd. of Osaka, Japan.

EXAMPLE 17

Black Ink Made From Urethane Wax, Urethane Resin and Urea Resin

In a stainless steel beaker were combined about 79.3 grams of the reaction product urethane material from Example 5, about 79.3 grams of the reaction product urea resin material from Example 8, about 135 grams of the reaction product mono-urethane wax material from Example 10 (stearyl stearurethane) and about 0.5 grams of Uniroyal Naugard 445 antioxidant[1]. The materials were melted together at a temperature of about 140° C. in an oven, then blended by stirring in a temperature controlled mantle at about 115° C. for about ½ hour. To this mixture was added about 5.8 grams of Solvent Black 45. After stirring for about ½ hour, the black ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 15.2 cPs as measured by a Ferranti-Shirley cone-plate viscometer at about 140° C., a melting point of about 81 ° C. as measured by differential scanning calorimetry using a DuPont 2100 calorimeter, and a $T_g$ of about 25° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 583 milliliters·Absorbance Units per gram at λmax.

[1]Naugard 445—antioxidant available from Uniroyal Chemical Company of Oxford, Conn.

EXAMPLE 18

Cyan Ink Made From Amide Wax, Mixed Urethane/Urea Resin and Cyan Colored Urethane Resin In a stainless steel beaker were combined about 250 grams of the cyan colored resin from Example 2 of co-pending U.S. patent application No. 08/672,617 filed concurrently herewith and assigned to the assignee of the present invention, about 250 grams of the reaction product urethane/urea mixture material from Example 2, about 540 grams of Witco S-180 stearyl stearamide[1] and about 2.0 grams of Uniroyal Naugard 445 antioxidant.[2] The materials were melted together at a temperature of 140° C. in an oven, then blended by stirring in a temperature controlled mantle at about 115° C. for about ½ hour. To this mixture was added about 5 grams of Solvent Blue 44. After stirring for about ½ hour, the cyan ink was filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 13.0 cPs as measured by a Ferranti-Shirley cone-plate viscometer at about 140° C., a melting point of about 89° C. as measured by differential scanning calorimetry using a DuPont 2100 calorimeter, and a $T_g$ of about 27.5° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1069 milliliters·Absorbance Units per gram at λmax.

[1]Kemamide S-180—Stearyl stearamide available from Witco Chemical Company of Memphis, Tenn.
[2]Naugard 445—antioxidant available from Uniroyal Chemical Company of Oxford, Conn.

EXAMPLE 19

Yellow Ink Made From Amide Wax, Mixed Urethane/Urea Resin and Yellow Colored Urethane Resin In a stainless steel beaker were combined about 98.6 grams of the colored resin from Example 1 of co-pending U.S. patent application No. 08/672,617 filed concurrently herewith and assigned to the assignee of the present invention, about 80.7 grams of the material from Example 2, about 179 grams of Witco S-180 stearyl stearamide[1] and about 0.7 grams of Uniroyal Naugard 445 antioxidant[2]. The materials were melted together at a temperature of about 140° C. in an oven, then blended by stirring in a temperature controlled mantle at about 115° C. for about ½ hour. The yellow ink was then filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 13.6 cPs as measured by a Ferranti-Shirley cone-plate viscometer at about 140° C., a melting point of about 90° C. as measured by differential scanning calorimetry using a DuPont 2100 calorimeter, and a $T_g$ of about 20° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 1497 milliliters·Absorbance Units per gram at λmax.

[1]Kemamide S-180—Stearyl stearamide available from Witco Chemical Company of Memphis, Tenn.
[2]Naugard 445—antioxidant available from Uniroyal Chemical Company of Oxford, Conn.

EXAMPLE 20

Black Ink Made From Amide Wax, Mixed Urethane/Urea Resin and Black Colored Urethane Resin In a stainless steel beaker were combined about 301 grams of the colored resin from Example 3 of co-pending U.S. patent application No. 08/672,617, filed concurrently herewith and assigned to the assignee of the present invention, about 374 grams of the reaction product urethane/urea mixture material from Example 2, about 802 grams of Witco S-180 stearyl stearamide[1] and about 3.0 grams of Uniroyal Naugard 445 antioxidant[2]. The materials were melted together at a temperature of about 140° C. in an oven, then blended by stirring in a temperature controlled mantle at about 115° C. for about ½ hour. The black ink was then filtered through a heated Mott apparatus (available from Mott Metallurgical) using #3 Whatman filter paper and a pressure of about 15 psi. The filtered phase change ink was poured into molds and allowed to solidify to form ink sticks. This final ink product was characterized by the following physical properties: viscosity of about 13.3 cPs as measured by a Ferranti-Shirley cone-plate viscometer at about 140° C., a melting point of about 89° C. as measured by differential scanning calorimetry using a DuPont 2100 calorimeter, and a $T_g$ of about 16° C. as measured by Dynamic Mechanical Analysis using a Rheometrics Solids Analyzer (RSAII). The spectral strength of the ink was determined using a spectrophotographic procedure based on the measurement of the colorant in solution by dissolving the solid ink in butanol and measuring the absorbance using a Perkin Elmer Lambda 2S UV/VIS spectrophotometer. The spectral strength of the ink was measured as about 869 milliliters·Absorbance Units per gram at λmax.

[1]Kemamide S-180—Stearyl stearamide available from Witco Chemical Company of Memphis, Tenn.
[2]Naugard 445—antioxidant available from Uniroyal Chemical Company of Oxford, Conn.

EXAMPLE 21

Yield Stress versus Temperature Curve for the Ink From Example 20 Compared to a Prior Art Phase Change Ink FIG. 1 is a graphical representation of the compression yield data for the ink of Example 20 plotted versus a prior art phase change ink found in Example 2 of U.S. Pat. No. 5,372,852. The tests were done on a MTS SYNTECH 2/D mechanical tester using cylindrical sample blocks of about 19 millimeters by 19 millimeters in size.

These results show that the test ink from Example 20 requires less pressure to fuse the test ink at elevated temperatures than the prior art ink and is therefore better adapted for offset printing applications, although it is also suitable for direct printing.

PRINT TESTING

The inks in examples 11–20 were tested in a Tektronix Phases 340 printer, which uses an offset transfer printing system. All of the above inks were found to completely transfer and to give images of good color, print quality and durability either as primary colors or when used in combination with each other or the commercially available Phases 340 printer inks.

The inks in Examples 18–20 were tested in a Tektronix Phaser® 300 printer, which uses a direct printing system. All of the above inks were found to give images of good color, print quality and durability either as primary colors or when used in combination with each other or the commercially available Phaser® 300 printer inks.

PHYSICAL PROPERTIES OF SELECTED WAXES, RESINS, AND INKS

Tables 1 and 2 are used to illustrate the differences in physical properties that can be achieved by the proper selection of functionality in analogous test molecules.

TABLE 1

| | Analogous Waxes | |
| --- | --- | --- |
| | MELTING POINT | VISCOSITY @ 140° C. |
| Stearyl Stearurethane (EXAMPLE 10) | 84° C. | 3.7 cPs |
| Stearyl Stearamide (Witco S-180) | 92° C. | 5.9 cPs |
| Stearyl Stearurea (EXAMPLE 9) | 113° C. | 13.2 cPs |

TABLE 2

Analogous Stearyl/IPDI Products

|  | MELTING POINT | VISCOSITY @ 140° C. |
|---|---|---|
| Stearyl/IPDI Urethane (EXAMPLE 7) | 48° C. | 11 cPs |
| Mixed Stearyl/IPDI Urea/Urethane (EXAMPLE 6) | 82° C. | 40 cPs |
| Stearyl/IPDI Urea (EXAMPLE 8) | 107° C. | 988 cPs |

Table 3 illustrates the difference in physical properties of resins that can be obtained by mixing both functionality and molecular shape and size.

TABLE 3

Mixtures of Abietic Alcohol and Stearyl Amine, Reacted with IPDI

| Alcohol/Amine Ratio | $T_g$'s/Melting Point/Viscosity |
|---|---|
| 100% Alcohol (EXAMPLE 1) | 48° C./72–76° C./4079 cPs @140° C. |
| 75% Alcohol/25% Amine (EXAMPLE 2) | 23° C./68–87° C./315 cPs @140° C. |
| 62.5% Alcohol/37.5% Amine (EXAMPLE 3) | 17° C./68–89° C./275 cPs @140° C. |
| 50% Alcohol/50% Amine (EXAMPLE 4) | 16° C./73–110° C./15.7 cPs @140° C. |

While the invention has been described above with reference to specific embodiments thereof, it is apparent that many changes, modifications and variations can be made without departing from the inventive concept disclosed herein. For example, it should be noted where a urethane reaction product is obtained, a single alcohol precursor or multiple alcohol precursors may be used with an appropriate isocyanate as long as the required stoichiometric ratio is maintained. Similarly, where a urea is the reaction product, a single amine precursor or multiple amine precursors may employed as long as the required stoichiometric ratio is maintained. Where a urethane/urea reaction product is obtained, single or multiple alcohol and amine precursors may be employed within the appropriate stoichiometric ratios. Accordingly, it is intended to embrace all such changes, modifications and variations that fall within the spirit and broad scope of the appended claims. All patent applications, patents and other publications cited herein are incorporated by reference in their entirety.

What is claimed is:

1. A phase change ink carrier composition comprising in combination:
   (a) a urethane resin that is a reaction product of at least octylphenol ethoxylate and an isocyanate;
   (b) a tackifier; and
   (c) a mono-amide.

2. The phase change ink carrier composition of claim 1 wherein the isocyanate in the urethane resin is selected from the group consisting of a monoisocyanate, a diisocyanate, a triisocyanate, a copolymer of a diisocyanate, and a copolymer of a triisocyanate.

3. The phase change ink carrier composition of claim 2 wherein the isocyanate in the urethane resin is isophorone diisocyanate.

4. The phase change ink carrier composition of claim 1 wherein the alcohol in the urethane resin also includes an alcohol selected from the group of alcohols consisting of a monohydric aliphatic alcohol, a monohydric aromatic alcohol, a monohydric aliphatic/aromatic alcohol, a monohydric fused ring alcohol, and a polyol and mixtures thereof.

5. The phase change ink carrier composition of claim 4 wherein the alcohol in the urethane resin also includes an alcohol selected from the group consisting of hydroabietyl alcohol and octadecyl alcohol.

6. The phase change ink carrier composition of claim 1 further comprising a phrase change compatible colorant to thereby form an ink composition.

7. The phase change ink composition of claim 6 wherein the phase change compatible colorant comprises a dye, a colored resin or a pigment.

8. The phase change ink carrier composition of claim 1 further comprising an anti-oxidant.

9. The phase change ink carrier composition of claim 1 wherein the reaction further comprises mixing the octyphenol ethoxylate and the isocyanate in an inert atmosphere.

10. The phase change ink carrier composition of claim 9 wherein nitrogen atmosphere is used as the inert atmosphere in the reaction.

11. The phase change ink carrier composition of claim 1 wherein the tackifier is a rosin ester.

12. The phase change ink carrier composition of claim 11 wherein the rosin ester is a glycerol rosin ester.

13. A phase change ink carrier composition comprising in combination:
   (a) a urethane resin that is a reaction product of at least one alcohol and an isocyanate, the at least one alcohol including octylphenol ethoxylate;
   (b) a rain ester tackifier, and
   (c) a mono-amide.

14. The phase change ink carrier composition of claim 13 wherein the isocyanate in the urethane resin is selected from the group consisting of a monoisocyanate, a diisocyanate, a triisocyanate, a copolymer of a diisocyanate, and a copolymer of a triisocyanate.

15. The phase change ink carrier composition of claim 13 wherein the isocyanate in the urethane resin is isophorone diisocyanate.

16. The phase change ink carrier composition of claim 13 wherein the alcohol in the urethane resin also includes an alcohol selected from the group of alcohols consisting of a monohydric aliphatic alcohol, a monohydric aromatic alcohol, a monohydric aliphatic/aromatic alcohol, a monohydric fused ring alcohol, and a polyol and mixtures thereof.

17. The phase change ink canter composition of claim 16 wherein the alcohol in the urethane resin also includes an alcohol selected from the group consisting of hydroabietyl alcohol and octadecyl alcohol.

18. The phase change ink carrier composition of claim 13 further comprising a phase change compatible colorant to thereby form an ink composition.

19. The phase change ink composition of claim 18 wherein the phase change compatible colorant comprises a dyes a colored resin or a pigment.

20. The phase change ink carrier composition of claim 13 further comprising an anti-oxidant.

21. A method for producing a layer of a phase change ink on a surface of a substrate, which comprises:
   (1) forming a phase change ink composition in the solid phase, comprising an admixture of (a) a phase change carrier composition and (b) a compatible colorant material; said phase change carrier composition comprising a urethane compound formed by the reaction of at least one fused alcohol with at least one isocyanate, a mono-amide, and a tackifier the at least one fused alcohol including octylphenol ethoxylate;

(2) transferring said solid phase, phase change ink composition to a phase change ink application means;

(3) raising the operating temperature of said application means to a level whereby a liquid phase, phase change ink composition is formed;

(4) providing a substrate in proximity to said application means;

(5) applying a predetermined pattern of said liquid phase, phase change ink composition to at least one surface of said substrate;

(6) lowering the temperature of said applied ink composition to form- a solid phase, phase change ink pattern on the substrate.

22. A method for producing a layer of a phase change ink on a surface of a substrate, which comprises:

(1) employing in a printing apparatus a phase change ink composition in the solid phase comprising an admixture of (a) a phase change carrier composition and (b) a compatible colorant material; the phase change carrier composition comprising a urethane compound formed by the reaction of at least one alcohol with at least one isocyanate, a monoamide, and a tackifier, the at least one alcohol including octylphenol ethoxylate;

(2) applying the phase change ink composition in a desired pattern to an intermediate transfer surface;

(3) transferring the desired pattern of the phase change ink composition to the surface of the substrate.

* * * * *

UNITED STATES PATENT AND TRADEMARK OFFICE
CERTIFICATE OF CORRECTION

PATENT NO. : 5,750,604
DATED : May 12, 1998
INVENTOR(S) : Jeffery H. Banning, et al.

It is certified that error appears in the above-identified patent and that said Letters Patent is hereby corrected as shown below:

Column 22, line 36, after "Tektronix" and before "340" delete "Phases" and insert -- Phaser®--.

Column 22, line 40, after "available" and before "340" delete "Phases" and insert -- Phaser®--.

Column 24, line 30, after "a" and before "ester" delete "rain" and insert --rosin--.

Column 25, line 12, after "form" and before "a" delete the "-".

Signed and Sealed this

Twenty-second Day of December, 1998

Attest:

BRUCE LEHMAN

*Attesting Officer*  *Commissioner of Patents and Trademarks*